(12) United States Patent
Ramesh et al.

(10) Patent No.: US 11,922,407 B2
(45) Date of Patent: Mar. 5, 2024

(54) SYSTEM, METHOD, AND COMPUTER PROGRAM PRODUCT FOR SECURE PAYMENT DEVICE DATA STORAGE AND ACCESS

(71) Applicant: Visa International Service Association, San Francisco, CA (US)

(72) Inventors: Shankara Narayanan Ramesh, Singapore (SG); Lin Htet Aung, Singapore (SG); Ibrahim Kusumah Kusnanto, Singapore (SG); Michael Angelo Sarmiento Olimpo, Singapore (SG); Leo Laksmana, Singapore (SG); Anup Tripathi, San Mateo, CA (US); Imo Michael Akpan, Miami, FL (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/639,990

(22) PCT Filed: Sep. 16, 2021

(86) PCT No.: PCT/US2021/050676
§ 371 (c)(1),
(2) Date: Mar. 3, 2022

(87) PCT Pub. No.: WO2023/043445
PCT Pub. Date: Mar. 23, 2023

(65) Prior Publication Data
US 2023/0085031 A1 Mar. 16, 2023

(51) Int. Cl.
*G06Q 20/40* (2012.01)
*G06Q 20/38* (2012.01)

(52) U.S. Cl.
CPC ....... *G06Q 20/382* (2013.01); *G06Q 20/4014* (2013.01)

(58) Field of Classification Search
CPC .................. G06Q 20/382; G06Q 20/4014
(Continued)

(56) References Cited

U.S. PATENT DOCUMENTS

| 2003/0155416 A1 | 8/2003 | Macklin et al. |
| 2009/0103730 A1 | 4/2009 | Ward et al. |

(Continued)

FOREIGN PATENT DOCUMENTS

| KR | 20210029198 A | * 3/2021 | |
| WO | WO-2014162113 A2 | * 10/2014 | ............. G06F 21/31 |

OTHER PUBLICATIONS

Dunjic, "SRC Eagle Has Landed!", Jun. 16, 2019, https://www.paydeology.com/post/src-eagle-has-landed, 5 pages.
(Continued)

*Primary Examiner* — Hani M Kazimi
(74) *Attorney, Agent, or Firm* — The Webb Law Firm

(57) ABSTRACT

Provided are a system, method, and computer program product for secure payment device data storage and access. The method includes storing payment device data associated with a payment device of a user and generating a unique uniform resource locator (URL) associated with the payment device. The method also includes transmitting the unique URL to an application provider system through a first communication channel and receiving a data access request from the client device via the unique URL through a second communication channel separate from the first communication channel. The method further includes, in response to receiving the data access request, verifying an identity of the user by executing a step-up authentication protocol. The method further includes, in response to verifying the identity of the user, transmitting a data access response including the payment device data to the client device through the second communication channel.

18 Claims, 9 Drawing Sheets

(58) Field of Classification Search
USPC .......................................................... 705/44
See application file for complete search history.

(56) References Cited

U.S. PATENT DOCUMENTS

| | | | |
|---|---|---|---|
| 2013/0204785 | A1 | 8/2013 | Monk et al. |
| 2016/0127352 | A1 | 5/2016 | Xu et al. |
| 2018/0247068 | A1* | 8/2018 | Levin .................... H04L 63/101 |
| 2019/0385160 | A1 | 12/2019 | Safak et al. |
| 2020/0019725 | A1 | 1/2020 | Rule et al. |
| 2020/0065789 | A1 | 2/2020 | McCarthy et al. |
| 2020/0382480 | A1* | 12/2020 | Isaacson ............ G06Q 30/0641 |
| 2021/0058392 | A1* | 2/2021 | Leddy, III ........ G06Q 20/40975 |
| 2021/0097525 | A1 | 4/2021 | Ravinathan et al. |
| 2022/0188855 | A1* | 6/2022 | Alapati ............... G06F 16/9566 |
| 2022/0201492 | A1* | 6/2022 | Park ...................... H04W 12/71 |

OTHER PUBLICATIONS

Gravanis et al., "'One Button Checkout': Where Doest it Fit in the World of Online Payments?", https://www.ul.com/resources/one-button-checkout-where does-it-fit-world-online-payments, 5 pages.
Oostdijk et al., "Step-up Authentication-as-a-Service", Nov. 14, 2012, <https:llspaces.at.internet2.edu/download/attachments/36702114/rapport_Step-up_Authentication-as-a-Service_Architecture_and_Procedures_final.pdf>, 44 pages.

\* cited by examiner

SYSTEM, METHOD, AND COMPUTER PROGRAM PRODUCT FOR SECURE PAYMENT DEVICE DATA STORAGE AND ACCESS

CROSS-REFERENCE TO RELATED APPLICATION

This application is the United States national phase of International Application No. PCT/US2021/050676 filed Sep. 16, 2021, the entire disclosure of which is hereby incorporated by reference in its entirety.

BACKGROUND

1. Field

This disclosure relates generally to data security and, in some non-limiting embodiments or aspects, to a system, method, and computer program product for secure, payment device data storage and access.

2. Technical Considerations

In order for a user to securely access payment device data on a client device, one or more entities may be involved with storing the payment device data and communicating the payment device data to the client device. Because payment device data may include sensitive information, e.g., primary account numbers (PANs), card verification values (CVVs), expiry dates, and/or the like, there is a need for all entities that possess or communicate such sensitive information to be secure. The more entities that possess payment device data, even for the purposes of relaying the payment device data from one entity to another, the more potential points of insecurity there are in a communication network. Therefore, more resources must be expended (e.g., encryption processing, increased data storage, increased bandwidth, increased security monitoring, etc.) for each entity that may come into contact with payment device data that includes sensitive information.

Entities that store, transmit, and/or receive payment device data may also need to be compliant with the Payment Card Industry Data Security Standard (PCI DSS), which includes heightened processing and storage requirements for such entities. Because compliance with the PCI DSS may necessitate greater computer resources to satisfy the heightened requirements, there is a need in the art to reduce the number of entities that must be compliant with the PCI DSS to operate in a given system.

Therefore, there is a need in the art for a technical solution that securely stores payment device data and provides for user access to the stored payment device data while also reducing the system burden to securely communicate payment device data.

SUMMARY

Accordingly, provided are improved systems, methods, and computer program products for secure payment device data storage and access.

According to some non-limiting embodiments or aspects, provided is a computer-implemented method for secure payment device data storage and access. The method includes storing, with at least one processor, payment device data associated with a payment device of a user. The method also includes generating, with the at least one processor, a unique uniform resource locator (URL) associated with the payment device, the unique URL accessible by a client device of the user. The method further includes transmitting, with the at least one processor, the unique URL to an application provider system through a first communication channel. The method further includes receiving, with the at least one processor, a data access request from the client device via the unique URL through a second communication channel separate from the first communication channel. The method further includes, in response to receiving the data access request, verifying, with the at least one processor, an identity of the user by executing a step-up authentication protocol. The method further includes, in response to verifying the identity of the user, transmitting, with the at least one processor, a data access response including the payment device data to the client device through the second communication channel.

In some non-limiting embodiments or aspects, the method may include receiving, with the at least one processor, a user enrollment request from the application provider system through the first communication channel, the user enrollment request associated with the user and initiated by the user on the client device. The method may also include, in response to receiving the user enrollment request, generating, with the at least one processor, a unique user token associated with the user. The method may further include, in response to receiving the user enrollment request, transmitting, with the at least one processor, the unique user token to the client device by transmitting a user enrollment response including the unique user token to the application provider system through the first communication channel. The payment device data may be stored in association with the unique user token.

In some non-limiting embodiments or aspects, the method may include receiving, with the at least one processor, a payment device enrollment request from the application provider system through the first communication channel, the payment device enrollment request including the unique user token and the payment device data. The method may also include, in response to receiving the payment device enrollment request, storing, with the at least one processor, the payment device data in association with the unique user token. The transmitting of the unique URL to the application provider system through the first communication channel may include transmitting a payment device enrollment response including the unique URL to the application provider system through the first communication channel.

In some non-limiting embodiments or aspects, the payment device enrollment request may be received, with the at least one processor, at a payment device issuance system, in response to a new payment device issuance request initiated by the user on the client device.

In some non-limiting embodiments or aspects, the method may include, in response to receiving the payment device enrollment request, generating, with the at least one processor, a unique payment device token associated with the payment device. The method may also include transmitting, with the at least one processor, the unique payment device token for storage on the client device by transmitting the payment device enrollment response including the unique payment device token to the application provider system through the first communication channel.

In some non-limiting embodiments or aspects, at least one of the following may be encrypted based on the client device and may be configured to be decrypted only by the client device: the payment device data; the unique URL; the data access response; or any combination thereof.

In some non-limiting embodiments or aspects, the unique URL may be a temporary, one-time-use URL, and the method may further include, before transmitting each subsequent data access response, regenerating, with the at least one processor, the unique URL associated with the payment device.

According to some non-limiting embodiments or aspects, provided is a system for secure payment device data storage and access. The system includes a server including at least one processor. The server is programmed or configured to store payment device data associated with a payment device of a user. The server is also programmed or configured to generate a unique uniform resource locator (URL) associated with the payment device, the unique URL accessible by a client device of the user. The server is further programmed or configured to transmit the unique URL to an application provider system through a first communication channel. The server is further programmed or configured to receive a data access request from the client device via the unique URL through a second communication channel separate from the first communication channel. The server is further programmed or configured to, in response to receiving the data access request, verify an identity of the user by executing a step-up authentication protocol. The server is further programmed or configured to, in response to verifying the identity of the user, transmit a data access response including the payment device data to the client device through the second communication channel.

In some non-limiting embodiments or aspects, the server may be further programmed or configured to receive a user enrollment request from the application provider system through the first communication channel, the user enrollment request associated with the user and initiated by the user on the client device. The server may be further programmed or configured to, in response to receiving the user enrollment request, generate a unique user token associated with the user. The server may be further programmed or configured to, in response to receiving the user enrollment request, transmit the unique user token to the client device by transmitting a user enrollment response including the unique user token to the application provider system through the first communication channel. The payment device data may be stored in association with the unique user token.

In some non-limiting embodiments or aspects, the server may be further programmed or configured to receive a payment device enrollment request from the application provider system through the first communication channel, the payment device enrollment request including the unique user token and the payment device data. The server may be further programmed or configured to, in response to receiving the payment device enrollment request, store the payment device data in association with the unique user token. The transmitting of the unique URL to the application provider system through the first communication channel may include transmitting a payment device enrollment response including the unique URL to the application provider system through the first communication channel.

In some non-limiting embodiments or aspects, the payment device enrollment request may be received at a payment device issuance system, in response to a new payment device issuance request initiated by the user on the client device.

In some non-limiting embodiments or aspects, wherein the server may be further programmed or configured to, in response to receiving the payment device enrollment request, generate a unique payment device token associated with the payment device. The server may be further programmed or configured to transmit the unique payment device token for storage on the client device by transmitting the payment device enrollment response including the unique payment device token to the application provider system through the first communication channel.

In some non-limiting embodiments or aspects, at least one of the following may be encrypted based on the client device and may be configured to be decrypted only by the client device: the payment device data; the unique URL; the data access response; or any combination thereof.

In some non-limiting embodiments or aspects, the unique URL may be a temporary, one-time-use URL, and the server may be further programmed or configured to, before transmitting each subsequent data access response, regenerate the unique URL associated with the payment device.

According to some non-limiting embodiments or aspects, provided is a computer program product for secure payment device data storage and access. The computer program product includes at least one non-transitory computer-readable medium including program instructions that, when executed by at least one processor, cause the at least one processor to store payment device data associated with a payment device of a user. The program instructions also cause the at least one processor to generate a unique uniform resource locator (URL) associated with the payment device, the unique URL accessible by a client device of the user. The program instructions further cause the at least one processor to transmit the unique URL to an application provider system through a first communication channel. The program instructions further cause the at least one processor to receive a data access request from the client device via the unique URL through a second communication channel separate from the first communication channel. The program instructions further cause the at least one processor to, in response to receiving the data access request, verify an identity of the user by executing a step-up authentication protocol. The program instructions further cause the at least one processor to, in response to verifying the identity of the user, transmit a data access response including the payment device data to the client device through the second communication channel.

In some non-limiting embodiments or aspects, the program instructions may further cause the at least one processor to receive a user enrollment request from the application provider system through the first communication channel, the user enrollment request associated with the user and initiated by the user on the client device. The program instructions may further cause the at least one processor to, in response to receiving the user enrollment request, generate a unique user token associated with the user. The program instructions may further cause the at least one processor to, in response to receiving the user enrollment request, transmit the unique user token to the client device by transmitting a user enrollment response including the unique user token to the application provider system through the first communication channel. The payment device data is stored in association with the unique user token.

In some non-limiting embodiments or aspects, the program instructions may further cause the at least one processor to receive a payment device enrollment request from the application provider system through the first communication channel, the payment device enrollment request including the unique user token and the payment device data. The program instructions may further cause the at least one processor to, in response to receiving the payment device enrollment request, store the payment device data in association with the unique user token. The transmitting of the unique URL to the application provider system through the first communication channel may include transmitting a payment device enrollment response including the unique URL to the application provider system through the first communication channel.

In some non-limiting embodiments or aspects, the program instructions may further cause the at least one processor to, in response to receiving the payment device enrollment request, generate a unique payment device token associated with the payment device. The program instructions may further cause the at least one processor to transmit the unique payment device token for storage on the client device by transmitting the payment device enrollment response including the unique payment device token to the application provider system through the first communication channel.

In some non-limiting embodiments or aspects, at least one of the following may be encrypted based on the client device and may be configured to be decrypted only by the client device: the payment device data; the unique URL; the data access response; or any combination thereof.

In some non-limiting embodiments or aspects, the unique URL may be a temporary, one-time-use URL, and the program instructions may further cause the at least one processor to, before transmitting each subsequent data access response, regenerate the unique URL associated with the payment device.

Further embodiments or aspects are set forth in the following numbered clauses:

Clause 1: A computer-implemented method comprising: storing, with at least one processor, payment device data associated with a payment device of a user; generating, with the at least one processor, a unique uniform resource locator (URL) associated with the payment device, the unique URL accessible by a client device of the user; transmitting, with the at least one processor, the unique URL to an application provider system through a first communication channel; receiving, with the at least one processor, a data access request from the client device via the unique URL through a second communication channel separate from the first communication channel; in response to receiving the data access request, verifying, with the at least one processor, an identity of the user by executing a step-up authentication protocol; and in response to verifying the identity of the user, transmitting, with the at least one processor, a data access response comprising the payment device data to the client device through the second communication channel.

Clause 2: The computer-implemented method of clause 1, further comprising: receiving, with the at least one processor, a user enrollment request from the application provider system through the first communication channel, the user enrollment request associated with the user and initiated by the user on the client device; and, in response to receiving the user enrollment request: generating, with the at least one processor, a unique user token associated with the user; and transmitting, with the at least one processor, the unique user token to the client device by transmitting a user enrollment response comprising the unique user token to the application provider system through the first communication channel; wherein the payment device data is stored in association with the unique user token.

Clause 3: The computer-implemented method of clause 1 or 2, further comprising: receiving, with the at least one processor, a payment device enrollment request from the application provider system through the first communication channel, the payment device enrollment request comprising the unique user token and the payment device data; and, in response to receiving the payment device enrollment request, storing, with the at least one processor, the payment device data in association with the unique user token; wherein the transmitting of the unique URL to the application provider system through the first communication channel comprises transmitting a payment device enrollment response comprising the unique URL to the application provider system through the first communication channel.

Clause 4: The computer-implemented method of any of clauses 1-3, wherein the payment device enrollment request is received, with the at least one processor, at a payment device issuance system, in response to a new payment device issuance request initiated by the user on the client device.

Clause 5: The computer-implemented method of any of clauses 1-4, further comprising: in response to receiving the payment device enrollment request, generating, with the at least one processor, a unique payment device token associated with the payment device; and transmitting, with the at least one processor, the unique payment device token for storage on the client device by transmitting the payment device enrollment response comprising the unique payment device token to the application provider system through the first communication channel.

Clause 6: The computer-implemented method of any of clauses 1-5, wherein at least one of the following is encrypted based on the client device and is configured to be decrypted only by the client device: the payment device data; the unique URL; the data access response; or any combination thereof.

Clause 7: The computer-implemented method of any of clauses 1-6, wherein the unique URL is a temporary, one-time-use URL, the method further comprising, before transmitting each subsequent data access response, regenerating, with the at least one processor, the unique URL associated with the payment device.

Clause 8: A system comprising a server comprising at least one processor, the server being programmed or configured to: store payment device data associated with a payment device of a user; generate a unique uniform resource locator (URL) associated with the payment device, the unique URL accessible by a client device of the user; transmit the unique URL to an application provider system through a first communication channel; receive a data access request from the client device via the unique URL through a second communication channel separate from the first communication channel; in response to receiving the data access request, verify an identity of the user by executing a step-up authentication protocol; and, in response to verifying the identity of the user, transmit a data access response comprising the payment device data to the client device through the second communication channel.

Clause 9: The system of clause 8, wherein the server is further programmed or configured to: receive a user enrollment request from the application provider system through the first communication channel, the user enrollment request associated with the user and initiated by the user on the client device; and, in response to receiving the user enrollment request: generate a unique user token associated with the user; and, transmit the unique user token to the client device by transmitting a user enrollment response comprising the unique user token to the application provider system through the first communication channel; wherein the payment device data is stored in association with the unique user token.

Clause 10: The system of clause 8 or 9, wherein the server is further programmed or configured to: receive a payment device enrollment request from the application provider system through the first communication channel, the payment device enrollment request comprising the unique user token and the payment device data; and, in response to receiving the payment device enrollment request, store the payment device data in association with the unique user token; wherein the transmitting of the unique URL to the application provider system through the first communication channel comprises transmitting a payment device enrollment response comprising the unique URL to the application provider system through the first communication channel.

Clause 11: The system of any of clauses 8-10, wherein the payment device enrollment request is received at a payment device issuance system, in response to a new payment device issuance request initiated by the user on the client device.

Clause 12: The system of any of clauses 8-11, wherein the server is further programmed or configured to: in response to receiving the payment device enrollment request, generate a unique payment device token associated with the payment device; and transmit the unique payment device token for storage on the client device by transmitting the payment device enrollment response comprising the unique payment device token to the application provider system through the first communication channel.

Clause 13: The system of any of clauses 8-12, wherein at least one of the following is encrypted based on the client device and is configured to be decrypted only by the client device: the payment device data; the unique URL; the data access response; or any combination thereof.

Clause 14: The system of any of clauses 8-13, wherein the unique URL is a temporary, one-time-use URL, the server being further programmed or configured to, before transmitting each subsequent data access response, regenerate the unique URL associated with the payment device.

Clause 15: A computer program product comprising at least one non-transitory computer-readable medium including program instructions that, when executed by at least one processor, cause the at least one processor to: store payment device data associated with a payment device of a user; generate a unique uniform resource locator (URL) associated with the payment device, the unique URL accessible by a client device of the user; transmit the unique URL to an application provider system through a first communication channel; receive a data access request from the client device via the unique URL through a second communication channel separate from the first communication channel; in response to receiving the data access request, verify an identity of the user by executing a step-up authentication protocol; and, in response to verifying the identity of the user, transmit a data access response comprising the payment device data to the client device through the second communication channel.

Clause 16: The computer program product of clause 15, wherein the program instructions further cause the at least one processor to: receive a user enrollment request from the application provider system through the first communication channel, the user enrollment request associated with the user and initiated by the user on the client device; and, in response to receiving the user enrollment request: generate a unique user token associated with the user; and, transmit the unique user token to the client device by transmitting a user enrollment response comprising the unique user token to the application provider system through the first communication channel; wherein the payment device data is stored in association with the unique user token.

Clause 17: The computer program product of clause 15 or 16, wherein the program instructions further cause the at least one processor to: receive a payment device enrollment request from the application provider system through the first communication channel, the payment device enrollment request comprising the unique user token and the payment device data; and, in response to receiving the payment device enrollment request, store the payment device data in association with the unique user token; wherein the transmitting of the unique URL to the application provider system through the first communication channel comprises transmitting a payment device enrollment response comprising the unique URL to the application provider system through the first communication channel.

Clause 18: The computer program product of any of clauses 15-17, wherein the program instructions further cause the at least one processor to: in response to receiving the payment device enrollment request, generate a unique payment device token associated with the payment device; and transmit the unique payment device token for storage on the client device by transmitting the payment device enrollment response comprising the unique payment device token to the application provider system through the first communication channel.

Clause 19: The computer program product of any of clauses 15-18, wherein at least one of the following is encrypted based on the client device and is configured to be decrypted only by the client device: the payment device data; the unique URL; the data access response; or any combination thereof.

Clause 20: The computer program product of any of clauses 15-19, wherein the unique URL is a temporary, one-time-use URL, the program instructions further causing the at least one processor to, before transmitting each subsequent data access response, regenerate the unique URL associated with the payment device.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments or aspects that are illustrated in the accompanying schematic figures, in which.

Figure 1:
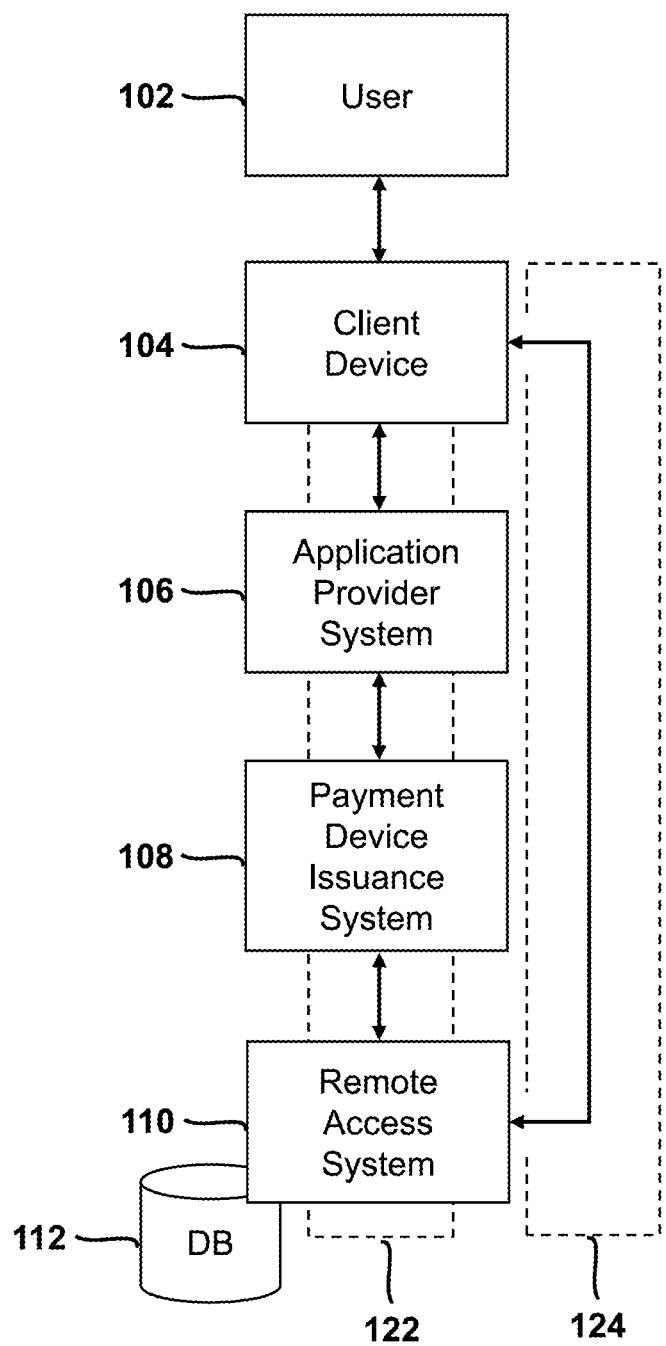
FIG. 1 is a diagram of a non-limiting embodiment or aspect of an environment in which systems, apparatuses, and/or methods, as described herein, may be implemented.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments or aspects.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the terms "request," "response," "request message," and "response message" may refer to one or more messages, data packets, signals, and/or data structures used to communicate data between two or more components or units (e.g., of computing devices).

As used herein, the terms "client" and "client device" may refer to one or more client-side devices or systems (e.g., remote from a transaction service provider) used to initiate or facilitate a communication (e.g., a payment transaction, a user enrollment request, a payment device enrollment request, a data access request, etc.). As an example, a "client device" may refer to one or more computing devices (e.g., communication devices, mobile devices, etc.) used by a user to operate a software application of an application provider, and/or the like. In some non-limiting embodiments or aspects, a client device may be an electronic device configured to communicate with one or more networks and initiate communications. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., user) that owns, utilizes, and/or operates a client device for initiating communications (e.g., for communicating with an application provider system and/or transaction service provider).

As used herein, the term "application provider" may refer to one or more entities that provide an interface (e.g., a software application operated locally or remotely) for access and/or operation on a client device. In some non-limiting embodiments or aspects, application provider may include a financial institution (e.g., an issuer, a transaction service provider, etc.) that provides a banking app (e.g., an account management application, a digital wallet application, etc.) that is operated at least partially on a client device of a user. As used herein, the term "application provider system" may refer to one or more systems operated by or on behalf of an application provider that provide one or more portions of the interface (e.g., display data, software for download, remotely operated software, etc.) for access and/or operation on a client device. Application provider system may include one or more servers associated with a backend system for communicating with an interface accessed and/or operated on a client device. In some non-limiting embodiments or aspects, application provider system may be associated with and/or included in an issuer system, a transaction service provider system, and/or the like.

As used herein, an electronic payment processing network may refer to the communications between one or more entities for processing the transfer of monetary funds to one or more transactions. The electronic payment processing network may include a merchant system, an acquirer system, a transaction service provider, and an issuer system.

Non-limiting embodiments or aspects of the present disclosure are directed to systems, methods, and computer program products for secure payment device data storage and access. Described systems and methods provide the technical improvement of removing unnecessary concurrent storage of payment device data, which provides the benefit of both reducing overall storage requirements and also reducing the number of computer resources required to maintain the payment device data, which may be necessary to comply with heightened security standards for processing payment device data. Described systems and methods allow for tokenization of users and payment devices, which allows application providers to identify users and payment devices without storing, receiving, or securing the information. Moreover, the use of multiple communication channels, including a second communication channel separate from a first communication channel, allows payment device data to be communicated to a user without exposing that data to other entities in a first communication channel, including application provider systems. Additionally, described systems and methods consolidate storage of payment data at a remote access system, where payment device data can be properly secured, which inherently removes duplicative data storage at one or more application provider systems and, once again, reduces potential exposure points and computer resources required in the system to protect the data.

Referring now to FIG. 1, illustrated is a schematic diagram of an environment 100 according to non-limiting embodiments or aspects of the present disclosure. The environment 100 may include a client device 104 (e.g., a mobile device) associated with a user 102, an application provider system 106, a payment device issuance system 108, a remote access system 110, a database 112, a first communication channel 122, and a second communication channel 124.

Client device 104 may include one or more computing devices (e.g., a mobile device) for use by a user 102 and configured to communicate with an application provider system 106, remote access system 110, and/or the like through a first communication channel 122. Client device 104 may be further configured to communicate with the remote access system 110 through a second communication channel 124. Client device 104 may be configured to operate software at least partly locally on the client device 104 to operate and display an interface for use by the user 102. In some non-limiting embodiments or aspects, client device 104 may be a mobile device operating a financial institution application as an interface on the client device 104, which may communicate with an application provider system 106 associated with the financial institution application.

The first communication channel 122 and/or the second communication channel 124 may include data transmission paths along one or more wired and/or wireless networks. For example, first communication channel 122 and/or second communication channel 124 may include any combination of wired and/or wireless transmission media, including, but not limited to, a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks. In some non-limiting embodiments or aspects, first communication channel 122 may be a different communication channel from second communication channel 124, while beginning and end devices in a communication path may be the same (e.g., client device 104, remote access system 110, etc.).

Application provider system 106 may include one or more computing devices configured to communicate with a client device 104, a payment device issuance system 108, a remote access system 110, and/or the like, through a first communication channel 122. Application provider system 106 may be associated with an issuer system, a transaction processing system, a third party financial institution system, and/or the like.

Payment device issuance system 108 may include one or more computing devices configured to communicate with an application provider system 106, a remote access system 110, and/or the like. Payment device issuance system 108 may be configured to communicate through the first communication channel 122. Payment device issuance system 108 may be associated with the process of issuing a new payment device for use by a user 102. Payment device issuance system 108 may, alone or in combination with other systems, include a transaction processing system, generate, or cause to be generated, new payment device data for a newly issued payment device. Payment device issuance system 108 may be associated with an issuer system, a transaction processing system, a third party issuance system, and/or the like.

Remote access system 110 may include one or more computing devices configured to communicate with a client device 104, an application provider system 106, a payment device issuance system 108, and/or the like through a first communication channel 122. Remote access system 110 may further be configured to communicate with a client device 104 through a second communication channel 124. Remote access system 110 may be associated with a transaction processing system and may include or be in communication with a database 112. Database 112 may include one or more storage mediums in one or more locations (e.g., a local data store, a cloud data store, etc.) for securely storing payment device data.

In some non-limiting embodiments or aspects, user 102 may desire to enroll themselves in a system for secure payment device storage and access. User 102 may operate an interface of a client device 104 to initiate a user enrollment request (e.g., a communication associated with and configured to trigger a user enrollment process, which may allow the user to use and participate in the system). The user enrollment request may be communicated to an application provider system 106 through a first communication channel 122. In response to receiving the user enrollment request, the application provider system 106 may initiate a step-up authentication protocol to verify the identity of the user 102. For example, the step-up authentication protocol may include a one-time password, which may be transmitted to the client device 104 in a communication channel (e.g., text message, email, call, etc.) separate from the first communication channel 122. User 102 may receive the one-time password and enter the one-time password into the interface of the client device 104. The one-time password may be verified at the client device 104 and/or at the application provider system 106.

In response to verification of the user's identity in a step-up authentication protocol, the application provider system 106 may communicate a user enrollment request to the payment device issuance system 108 and/or the remote access system 110 through a first communication channel 122. If the user enrollment request is communicated to the payment device issuance system 108, the user enrollment request may then be communicated to the remote access system 110.

In response to receiving the user enrollment request, the remote access system 110 may generate a unique user token (e.g., a username, a code, an identifier, etc.) associated with the user 102 and transmit the unique user token to the client device 104 by transmitting a user enrollment response (e.g., including the unique user token) through the first communication channel 122. For example, the user enrollment response (e.g., a communication associated with a result of the user enrollment process) may be communicated to the application provider system 106 and/or the payment device issuance system 108. If the user enrollment response is communicated to the payment device issuance system 108, the user enrollment response may then be communicated to the application provider system 106. The application provider system 106 may communicate the user enrollment response to the client device 104. The unique user token may be stored at the client device 104, the application provider system 106, and/or the payment device issuance system 108.

In some non-limiting embodiments or aspects, user 102 may desire to issue a new payment device in a system for secure payment device data storage and access. User 102 may operate an interface of a client device 104 to initiate a payment device issuance request (e.g., a communication associated with and configured to trigger issuance of a new payment device). The payment device issuance request may be communicated to an application provider system 106 through a first communication channel 122. It will be appreciated that a payment device issuance request may also be referred to herein as a payment device enrollment request, and may include the additional process of issuing a new payment device before enrolling the payment device in a system for secure payment device data storage and access.

In response to receiving the payment device issuance request, the application provider system 106 may communicate a payment device issuance request to the payment device issuance system 108 through a first communication channel 122. In response to receiving the payment device issuance request, the payment device issuance system 108 may execute one or more checks (e.g., entitlement checks, Office of Foreign Assets Control (OFAC) checks, credit checks, etc.) to determine that the user 102 may be issued a new payment device. If one or more checks do not pass, the payment device issuance system 108 may communicate a payment device issuance response to the client device 104 and/or the application provider system 106 indicating that issuance of a new payment device is denied. If one or more checks pass, the payment device issuance system 108 may generate new payment device data and generate a payment device enrollment request to the remote access system 110 for the new payment device. The payment device enrollment request may include payment device data to be stored securely for the user 102.

In response to receiving the payment device enrollment request, the remote access system 110 may store the payment device data. The payment device data may be stored in association with a unique user token. Further, the payment device issuance system 108 and/or the remote access system 110 may generate a unique payment device token associated with the payment device and transmit the unique payment device token in a payment device enrollment response through a first communication channel 122. The payment device enrollment response may be transmitted to the payment device issuance system 108. The payment device issuance system 108 may transmit the payment device enrollment response to the application provider system 106. The application provider system 106 may transmit the payment device enrollment response to the client device 104. The unique payment device token may be stored at the client device 104, the application provider system 106, and/or the payment device issuance system 108. It will be appreciated that, by entities outside of the payment device issuance system 108 and/or remote access system 110 storing a unique payment device token instead of payment device data, the same level of computer resources that would have been required to secure payment device data itself would not be required.

In response to receiving the payment device enrollment request, the remote access system 110 may also generate a unique uniform resource locator (URL) associated with the payment device. The unique URL may be configured to be accessible (e.g., used to access data at the URL address through a second communication channel 124) by the client device 104. The unique URL may be transmitted in the payment device enrollment response to the client device 104 through the first communication channel 122. For example, the payment device enrollment response, including the unique URL, may be transmitted directly or indirectly to the client device via the application provider system 106 and/or the payment device issuance system 108. The unique URL may be stored at the client device 104 and/or the application provider system 106. The unique URL may be encrypted based on the client device 104 (e.g., a unique client device token or unique payment device token associated with the client device 104), so that the unique URL may be decrypted only by the client device 104. The unique URL may also be a temporary, one-time-use URL, and may be regenerated and re-transmitted by the payment device issuance system 108 and/or remote access system 110 after each time the unique URL is used by the user 102 to access payment device data. The unique URL may also be a deep URL (e.g., a deep link).

In some non-limiting embodiments or aspects, user 102 may desire to enroll an existing payment device in a system for secure payment device data storage and access. For example, a physical payment device may exist, and the user 102 may wish to save the payment device data for use in a digital wallet, or securely and remotely store the payment device data for later access. User 102 may operate an interface of a client device 104 to initiate a payment device enrollment request (e.g., a communication associated with and configured to trigger enrollment of a payment device in a system for secure payment device data storage and access, which will allow the payment device to have its data securely stored and accessed in the system). The payment device enrollment request may be communicated to an application provider system 106 through a first communication channel 122. It will be appreciated that a payment device enrollment request may also be referred to herein as a payment device issuance request for instances of enrolling a new payment device after issuance is completed.

In response to receiving the payment device enrollment request, the application provider system 106 may communicate a payment device enrollment request to the payment device issuance system 108 through a first communication channel 122. In response to receiving the payment device enrollment request, the payment device issuance system 108 may execute one or more checks (e.g., entitlement checks, Office of Foreign Assets Control (OFAC) checks, credit checks, etc.) to determine that the user 102 may be enrolled in the system for secure payment device data storage and access. If one or more checks do not pass, the payment device issuance system 108 may communicate a payment device enrollment response to the client device 104 and/or the application provider system 106 indicating that enrollment of the payment device is denied. If one or more checks pass, the payment device issuance system 108 may generate a unique payment device token for the existing payment device and generate a payment device enrollment request to the remote access system 110 for the payment device. The payment device enrollment request may include payment device data to be stored securely for the user 102.

In response to receiving the payment device enrollment request, the remote access system 110 may store the payment device data. The payment device data may be stored in association with a unique user token. Further, the payment device issuance system 108 and/or remote access system 110 may generate a unique payment device token associated with the payment device and transmit the unique payment device token in a payment device enrollment response through a first communication channel 122. The payment device enrollment response may be transmitted to the payment device issuance system 108. The payment device issuance system 108 may transmit the payment device enrollment response to the application provider system 106. The application provider system 106 may transmit the payment device enrollment response to the client device 104. The unique payment device token may be stored at the client device 104, the application provider system 106, and/or the payment device issuance system 108. It will be appreciated that, by entities outside of the payment device issuance system 108 and/or remote access system 110 storing a unique payment device token instead of payment device data, the same level of computer resources that would have been required to secure payment device data itself would not be required.

In response to receiving the payment device enrollment request for the existing payment device, the remote access system 110 may also generate a unique uniform resource locator (URL) associated with the payment device. The unique URL may be configured to be accessible (e.g., used to access data at the URL address through a second communication channel 124) by the client device 104. The unique URL may be transmitted in the payment device enrollment response to the client device 104 through the first communication channel 122. For example, the payment device enrollment response, including the unique URL, may be transmitted directly or indirectly to the client device 104 via the application provider system 106 and/or the payment device issuance system 108. The unique URL may be stored at the client device 104 and/or the application provider system 106. The unique URL may be encrypted based on the client device 104 (e.g., a unique client device token or unique payment device token associated with the client device 104), so that the unique URL may be decrypted only by the client device 104. The unique URL may also be a temporary, one-time-use URL, and may be regenerated and re-transmitted by the payment device issuance system 108 and/or remote access system 110 after each time the unique URL is used by the user 102 to access payment device data.

In some non-limiting embodiments or aspects, user 102 may desire to access payment device data of a payment device enrolled in a system for secure payment device data storage and access. User 102 may initiate a data access request (e.g., a communication associated with and configured to trigger a data access process in a system for secure payment device data storage and access) in an interface of the client device 104. In some non-limiting embodiments or aspects, if the unique URL is stored on the client device 104, the client device 104 may use the unique URL in a data access request to the remote access system 110 through a second communication channel 124 (e.g., by opening a browser in a same or separate interface of the client device 104 to access a URL address of the unique URL). In some non-limiting embodiments or aspects, if the unique URL is stored at the application provider system 106, client device 104 may communicate with the application provider system 106 to receive the unique URL through a first communication channel 122, and then use the unique URL in a data access request to the remote access system 110 through the second communication channel 124.

In response to receiving the data access request, the remote access system 110 may verify the identity of the user 102 executing a step-up authentication protocol. For example, the step-up authentication protocol may include a one-time password, which may be transmitted to the client device 104 in a communication channel (e.g., text message, email, call, etc.) separate from the second communication channel 124. User 102 may receive the one-time password and enter the one-time password into an interface of the client device 104. The one-time password may be verified at the remote access system 110. If the step-up authentication protocol fails and the user's 102 identity cannot be verified, the remote access system 110 may transmit a data access response to the client device 104 indicating that the data access request is denied.

In response to verifying the identity of the user 102, the remote access system 110 may transmit a data access response including the requested payment device data to the client device 104 through the second communication channel 124. The payment device data and/or the data access response may be encrypted based on the client device 104 (e.g., a unique client device token or unique payment device token associated with the client device 104), so that the payment device data and/or the data access response may be decrypted only by the client device 104.

Figure 2:
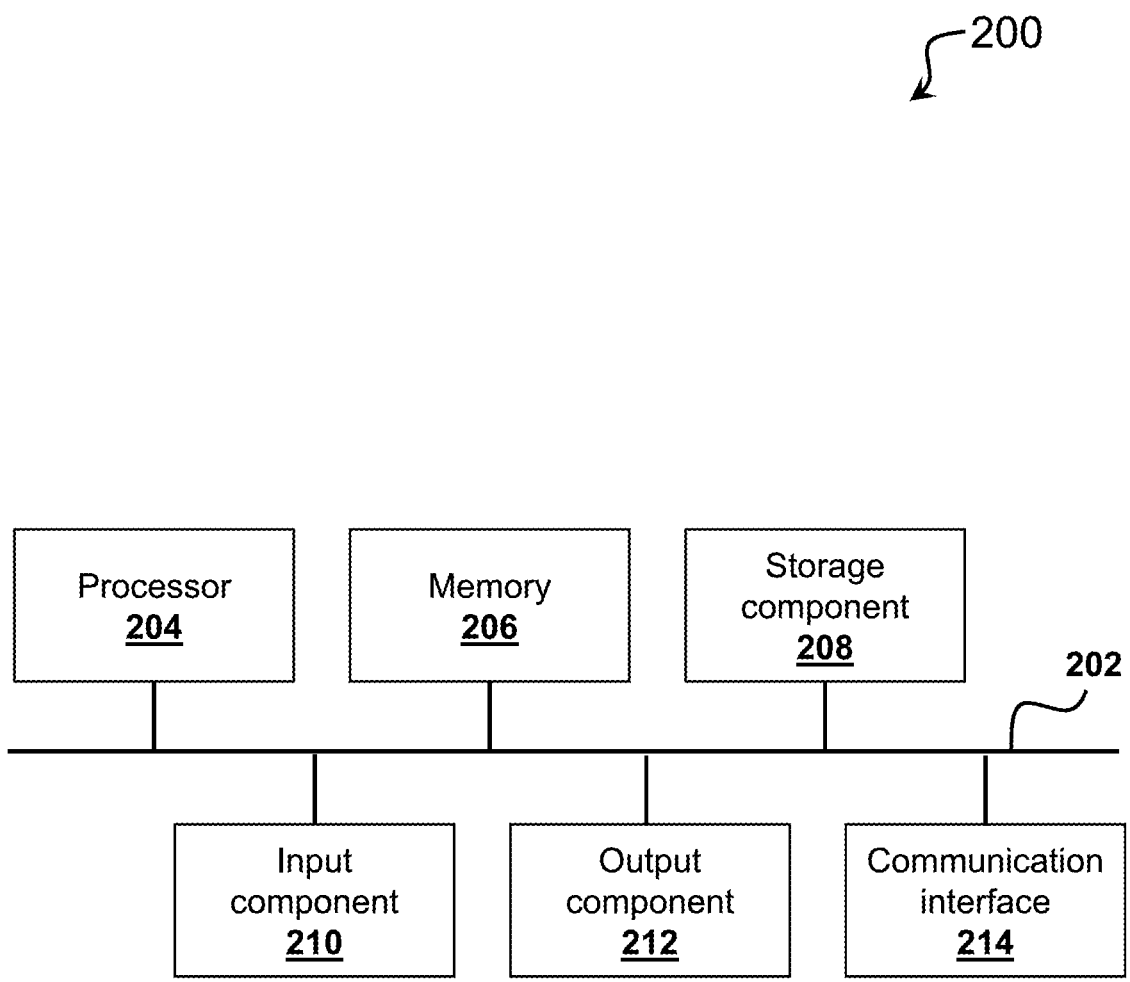
FIG. 2 is a diagram of non-limiting embodiments or aspects of components of one or more devices or systems of FIG. 1.

Referring now to FIG. 2, illustrated is a diagram of example components of device 200. Device 200 may correspond to one or more devices of client device 104, application provider system 106, payment device issuance system 108, remote access system 110, database 112, and/or first communication channel 122 and second communication channel 124 for communication therebetween. In some non-limiting embodiments or aspects, one or more devices of the foregoing may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
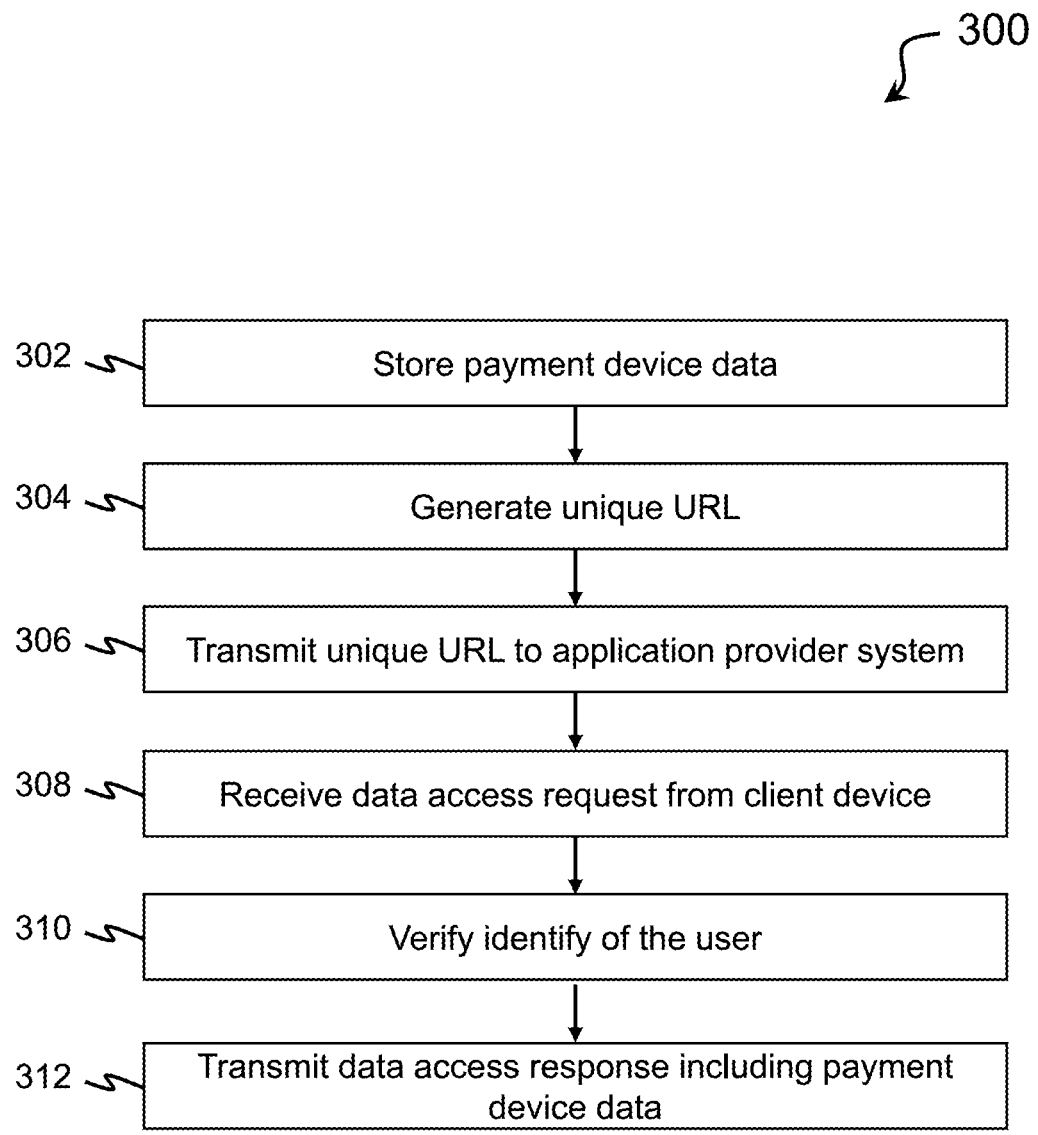
FIG. 3 is a flowchart illustrating a non-limiting embodiment or aspect of a method for secure payment device data storage and access, according to the principles of the present disclosure.

Referring now to FIG. 3, illustrated is a flow diagram of a method 300 for secure payment device data storage and access. One or more steps of method 300 may be executed by one or more processors of a remote access system 110. Additionally or alternatively, one or more steps of method 300 may be executed (e.g., completely, partially, and/or the like) by another system, another device, another group of systems, or another group of devices, separate from or including remote access system 110, such as application provider system 106 and/or payment device issuance system 108. Each step of method 300 may be performed by a same or different processor.

In step 302, payment device data may be stored. For example, remote access system 110 may store payment device data that is associated with a payment device of a user 102. The payment device data may be stored in a database 112 included in or associated with remote access system 110.

In step 304, a unique uniform resource locator (URL) may be generated. For example, remote access system 110 may generate a unique URL associated with the payment device. The unique URL may be configured to be accessible by a client device 104 of the user 102 and may be a temporary, one-time-use URL that provides a dynamic address location for communicating a data access request for payment device data and receiving the payment device data.

In step 306, the unique URL may be transmitted to an application provider system 106. For example, remote access system 110 may transmit the unique URL to an application provider system 106 through a first communication channel 122. The application provider system 106 may store the unique URL. In some non-limiting embodiments or aspects, the application provider system 106 may forward the unique URL to the client device 104 for the client device 104 to store the unique URL. The unique URL may be encrypted based on the client device 104 and be configured to be decrypted only by the client device 104.

In step 308, a data access request may be received from the client device 104. For example, remote access system 110 may receive a data access request from the client device 104 via the unique URL through a second communication channel 124 separate from the first communication channel 122.

In step 310, an identity of the user 102 may be verified. For example, remote access system 110 may, in response to receiving the data access request in step 308, verify an identity of the user 102 by executing a step-up authentication protocol. In some non-limiting embodiments or aspects, the step-up authentication protocol may include a one-time password, which may be transmitted to the client device 104 in a communication channel (e.g., text message, email, call, etc.) separate from the second communication channel 124. A one-time password may be received at the remote access system 110 from the client device 104 and may be verified as matching the generated one-time password at the remote access system 110. If the step-up authentication protocol fails and the user's 102 identity cannot be verified, the remote access system 110 may transmit a data access response to the client device 104 indicating that the data access request is denied. Otherwise, the identity of the user 102 may be verified.

In step 312, a data access response may be transmitted. For example, remote access system 110 may, in response to verification of the user's 102 identity in step 310, transmit a data access response including the payment device data to the client device 104 through the second communication channel 124. The payment device data and/or the data access response may be encrypted based on the client device 104, so that the payment device data and/or the data access response may be decrypted only by the client device 104.

Figure 4:
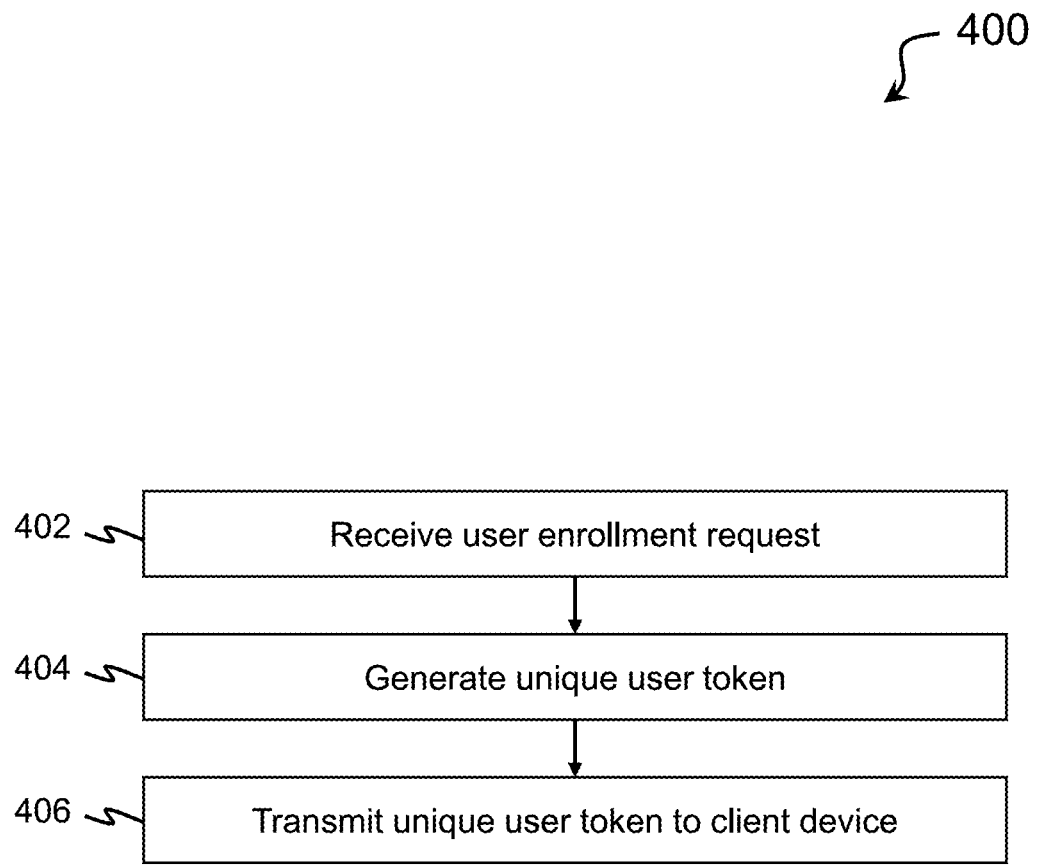
FIG. 4 is a flowchart illustrating a non-limiting embodiment or aspect of a method for secure payment device data storage and access, according to the principles of the present disclosure.

Referring now to FIG. 4, illustrated is a flow diagram of a method 400 for user enrollment in system for secure payment device data storage and access. One or more steps of method 400 may be executed by one or more processors of a remote access system 110. Additionally or alternatively, one or more steps of method 400 may be executed (e.g., completely, partially, and/or the like) by another system, another device, another group of systems, or another group of devices, separate from or including remote access system 110, such as application provider system 106 and/or payment device issuance system 108. Each step of method 400 may be performed by a same or different processor.

In step 402, a user enrollment request may be received. For example, remote access system 110 may receive a user enrollment request from the application provider system 106 through the first communication channel 122. The user enrollment request may be associated with the user 102 and initiated by the user 102 on the client device 104. The user enrollment request may include user data (e.g., name, birth date, address, client device identifier, etc.) for storage by the remote access system 110 in the database 112.

In step 404, a unique user token may be generated. For example, in response to receiving the user enrollment request, remote access system 110 may generate, with at least one processor, a unique user token associated with the user 102. The user token may be used to identity the user 102 in the system for secure payment device date storage and access. In some non-limiting embodiments or aspects, the payment device data may be stored in the database 112 in association with the unique user token.

In step 406, the unique user token may be transmitted. For example, in response to receiving the user enrollment request and after generating the unique user token, remote access system 110 may transmit the unique user token to the client device 104 by transmitting a user enrollment response including the unique user token to the application provider system 106 through the first communication channel 122. The unique user token may be stored at the client device 104 and/or at the application provider system 106.

It will be appreciated that steps 402-406 may be executed prior to a payment device enrollment process as described in connection with FIG. 5.

Figure 5:
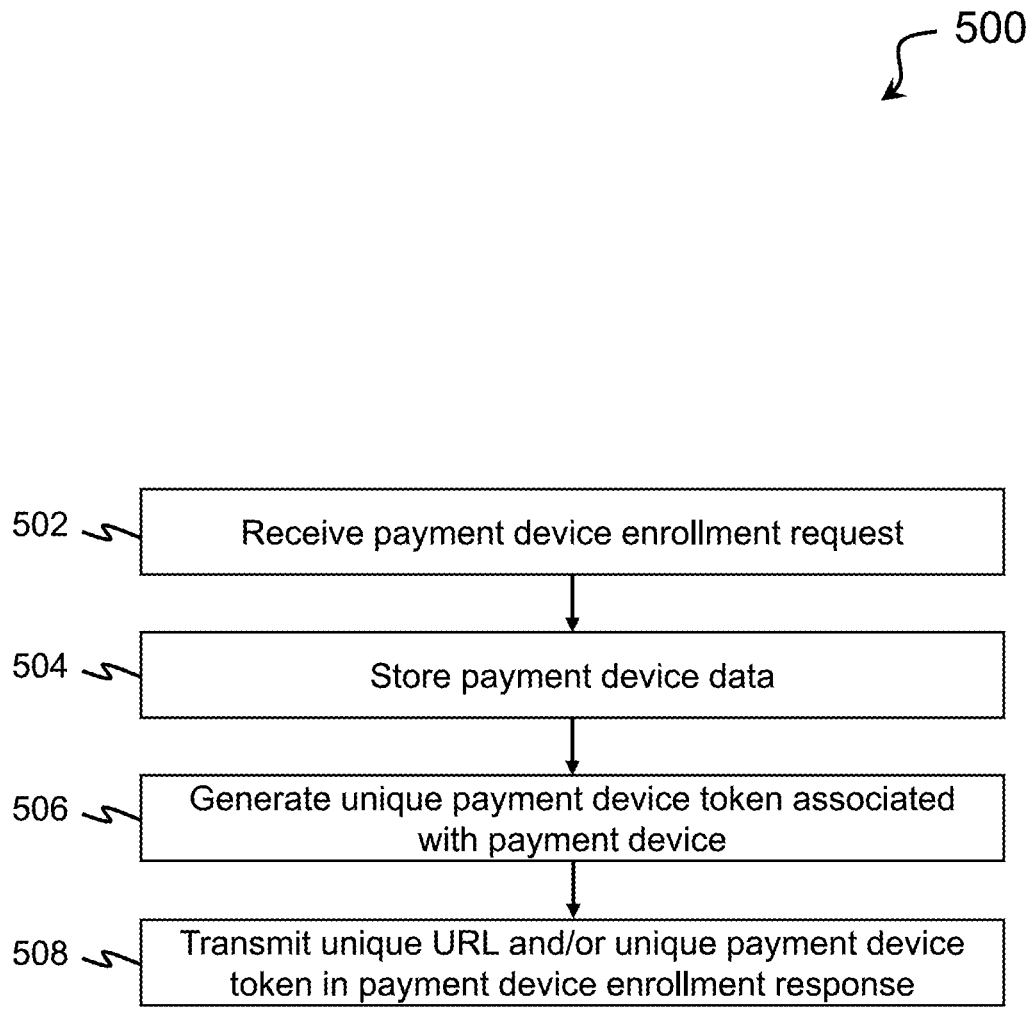
FIG. 5 is a flowchart illustrating a non-limiting embodiment or aspect of a method for secure payment device data storage and access, according to the principles of the present disclosure.

Referring now to FIG. 5, illustrated is a flow diagram of a method 500 for payment device enrollment in a system for secure payment device data storage and access. One or more steps of method 500 may be executed by one or more processors of a remote access system 110. Additionally or alternatively, one or more steps of method 500 may be executed (e.g., completely, partially, and/or the like) by another system, another device, another group of systems, or another group of devices, separate from or including remote access system 110, such as application provider system 106 and/or payment device issuance system 108. Each step of method 500 may be performed by a same or different processor.

In step 502, a payment device enrollment request may be received. For example, remote access system 110 may receive a payment device enrollment request from the application provider system 106 through the first communication channel 122. The payment device enrollment request may include the unique user token and payment device data for a payment device to be enrolled. In some non-limiting embodiments or aspects, the payment device to be enrolled may be newly issued by a payment device issuance system 108 as part of and/or prior to communicating a payment device enrollment request to the remote access system 110.

In step 504, payment device data may be stored. For example, remote access system 110 may, in response to receiving the payment device enrollment request, store the payment device data in association with the unique user token. It will be appreciated that step 504 may include step 302 of FIG. 3, in which payment device data of a payment device is stored by the remote access system 110.

In step 506, a unique payment device token may be generated. For example, remote access system 110 and/or payment device issuance system 108 may, in response to the payment device enrollment request initiated by the user 102, generate a unique payment device token associated with the payment device.

In step 508, the unique URL and/or unique payment device token may be transmitted. For example, remote access system 110 may transmit the unique URL and/or the unique payment device token in a payment device enrollment response. The payment device enrollment response may be communicated to the client device 104 via the application provider system 106 through the first communication channel 122. The unique payment device token may be stored on the client device 104 and/or at the application provider system 106.

Figure 6:
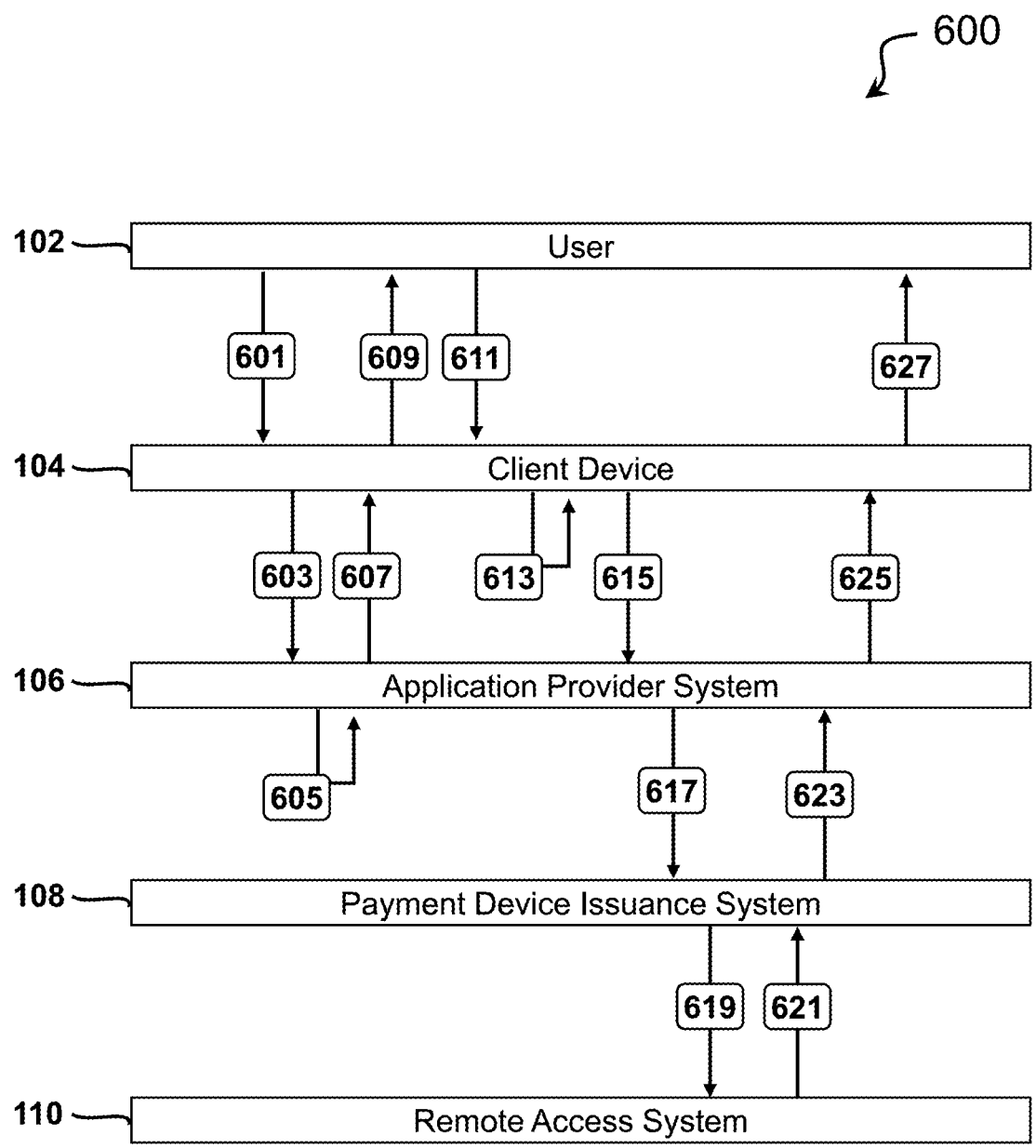
FIG. 6 is a process diagram illustrating a non-limiting embodiment or aspect of a method for secure payment device data storage and access, according to the principles of the present disclosure.

Referring now to FIG. 6, illustrated is a process diagram of a method 600 for user enrollment in a system for secure payment device data storage and access. The non-limiting embodiments or aspects depicted include steps of method 600 that are by and between user 102, client device 104, application provider system 106, payment device issuance system 108, and remote access system 110. It will be appreciated that one or more functions or steps of application provider system 106, payment device issuance system 108, and/or remote access system 110 may be executed by another system thereof.

User 102 may desire to enroll themselves in a system for secure payment device data storage and access. In step 601, user 102 may initiate a user enrollment request by selecting a respective option in an interface of the client device 104. For example, the user 102 may select a "Create new user" option. In response, in step 603, client device 104 may transmit a user enrollment request to the application provider system 106. For example, the client device 104 may execute a HTTP POST request method to the application provider system 106 through the first communication channel 122. In response to receiving the user enrollment request, application provider system 106 may, in step 605, execute a step-up authentication protocol (e.g., a one-time password process) to verify the identity of the user 102.

In step 607, application provider system 106 may instruct the client device 104 to display an input in the interface for accepting input of a one-time password. In step 609, the user 102 may observe the interface displaying a request for input of a one-time password transmitted from the application provider system 106. The user 102 may receive this one-time password in a channel separate from the first communication channel 122 and may, in step 611, enter the one-time password into the respective input of the interface of the client device 104. The client device 104 may then, in step 613, verify the one-time password (e.g., independently or by communicating with the application provider system 106). In step 615, the client device 104 may communicate a message indicating successful completion of the step-up authentication protocol to the application provider system 106.

In response to successful completion of the step-up authentication protocol, the application provider system 106 may, in step 617, communicate a user enrollment request to the payment device issuance system 108. For example, the application provider system 106 may execute a HTTP POST request method to the payment device issuance system 108 through the first communication channel 122 to trigger user enrollment. In response to receipt of the user enrollment request, the payment device issuance system 108 may, in step 619, communicate a user enrollment request to the remote access system 110 that includes user data. For example, the payment device issuance system 108 may execute a HTTP POST request method to the remote access system 110 through the first communication channel 122 to trigger user enrollment.

In response to receipt of the user enrollment request, the remote access system 110 may, in step 621, communicate a user enrollment response to the payment device issuance system 108 through the first communication channel 122. The user enrollment response may include a unique user token generated by the remote access system 110 for completion of the user enrollment process. The unique user token may serve as a common identity for mapping to a user 102 between the application provider system 106, the payment device issuance system 108, and the remote access system 110. In step 623, the user enrollment response may be communicated from the payment device issuance system 108 to the application provider system 106 through the first communication channel 122. In step 625, the user enrollment response may be communicated from the application provider system 106 to the client device 104 through the first communication channel 122. In step 627, the client device 104 may display a message to the user 102 indicating that the user 102 was successfully enrolled in the system for secure payment device data storage and access.

Figure 7:
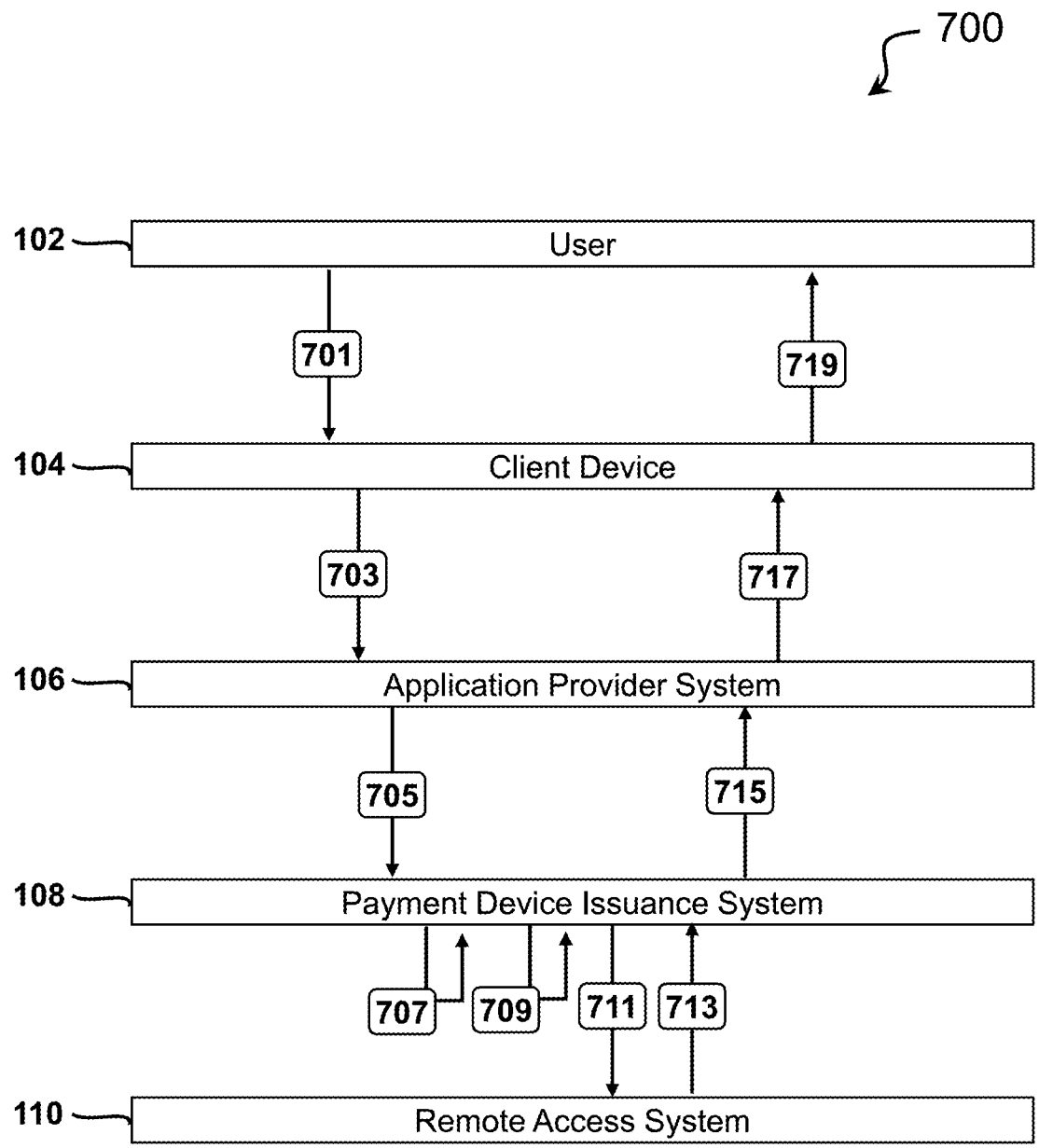
FIG. 7 is a process diagram illustrating a non-limiting embodiment or aspect of a method for secure payment device data storage and access, according to the principles of the present disclosure.

Referring now to FIG. 7, illustrated is a process diagram of a method 700 for payment device issuance and enrollment in a system for secure payment device data storage and access. The non-limiting embodiments or aspects depicted include steps of method 700 that are by and between user 102, client device 104, application provider system 106, payment device issuance system 108, and remote access system 110. It will be appreciated that one or more functions or steps of application provider system 106, payment device issuance system 108, and/or remote access system 110 may be executed by another system thereof.

User 102 may desire to initiate issuance of a new payment device that will be subsequently enrolled in a system for secure payment device data storage and access. In step 701, the user 102 may initiate a payment device issuance request in an interface of the client device 104. For example, the user 102 may select an "Issue new card" option in the interface of the client device 104. In step 703, the client device 104 may communicate a payment device issuance request to the application provider system 106. For example, the client device 104 may execute a HTTP POST request method to the application provider system 106 through the first communication channel 122. In step 705, the application provider system 106 may communicate a payment device issuance request to a payment device issuance system 108. For example, the application provider system 106 may execute a HTTP POST request method to the payment device issuance system 108 through the first communication channel 122.

In response to receiving the payment device issuance request, the payment device issuance system 108 may, in step 707, execute one or more checks to determine that the user may be issued a new payment device. In step 709, in response to one or more of the checks being passed, the payment device issuance system 108 may generate new payment device data and a unique payment device token for a new payment device. In step 711, the payment device issuance system 108 may generate a payment device enrollment request to a remote access system 110 for the newly issued payment device to be enrolled in the system for secure payment device storage and access. For example, the payment device issuance system 108 may execute a HTTP POST request method to the remote access system 110 through the first communication channel 122.

In response to receiving the payment device enrollment request, which may include payment device data, the remote access system 110 may, in step 713, communicate a payment device enrollment response including a unique URL generated in association with the payment device. For example, the remote access system 110 may execute a HTTP 200 response method including the unique URL to the payment device issuance system 108 through the first communication channel 122. In step 715, the payment device issuance system 108 may communicate a payment device enrollment response including the unique payment device token and the unique URL to the application provider system 106. For example, the payment device issuance system 108 may execute a HTTP 200 response method to the application provider system 106 through the first communication channel 122. In step 717, the application provider system 106 may communicate a payment device enrollment response to the client device 104 including the unique payment device token and the unique URL. For example, the application provider system 106 may execute a HTTP 200 response method to the client device 104 through the first communication channel 122. In step 719, the user 102 may be able to see a message on the client device 104 that payment device enrollment was successful and may be prompted to view the payment device data by using the unique URL.

Figure 8:
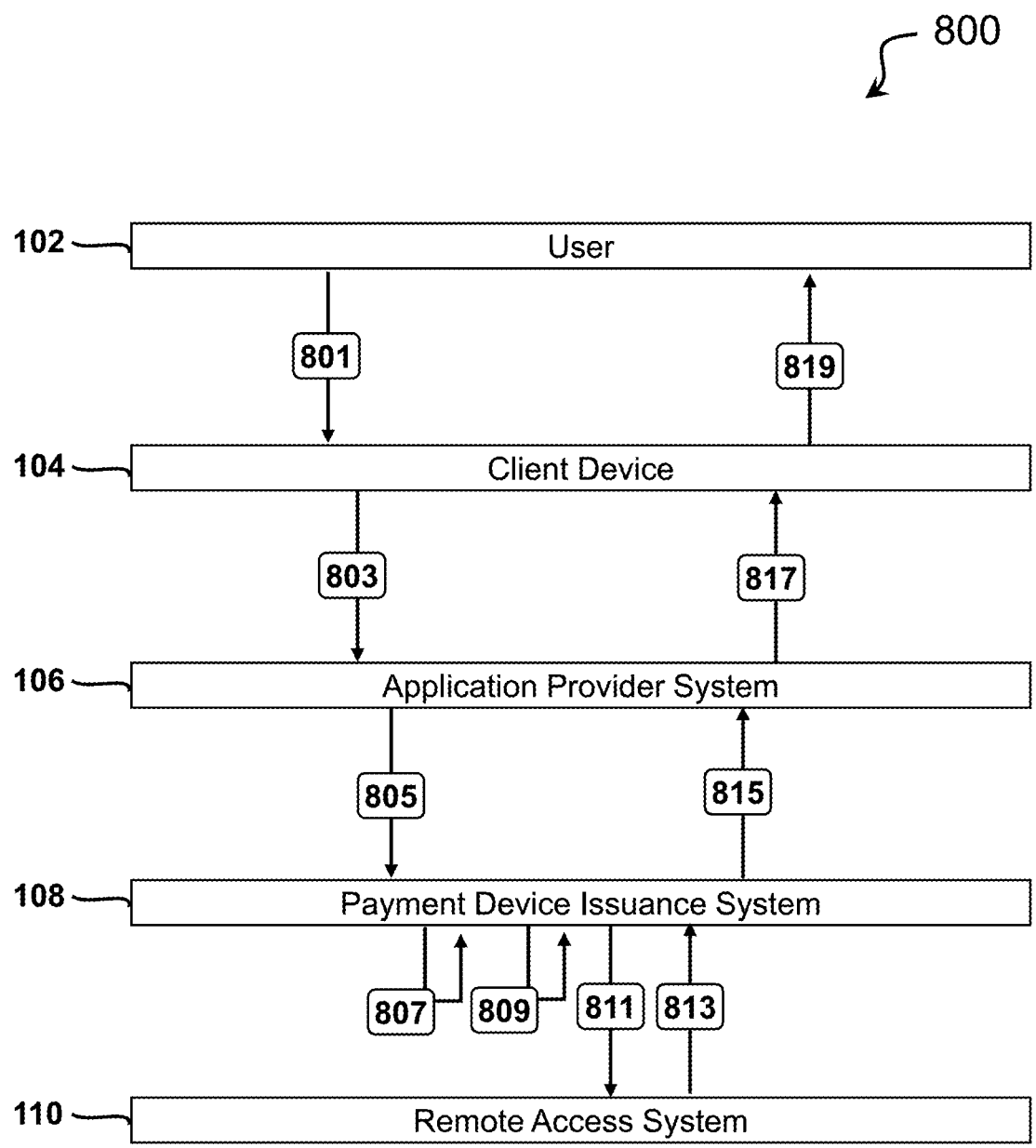
FIG. 8 is a process diagram illustrating a non-limiting embodiment or aspect of a method for secure payment device data storage and access, according to the principles of the present disclosure.

Referring now to FIG. 8, illustrated is a process diagram of a method 800 for payment device enrollment of an existing payment device in a system for secure payment device data storage and access. The non-limiting embodiments or aspects depicted include steps of method 800 that are by and between user 102, client device 104, application provider system 106, payment device issuance system 108, and remote access system 110. It will be appreciated that one or more functions or steps of application provider system 106, payment device issuance system 108, and/or remote access system 110 may be executed by another system thereof.

User 102 may desire to initiate enrollment of an existing payment device in a system for secure payment device data storage and access. In step 801, the user 102 may initiate a payment device enrollment request in an interface of the client device 104. For example, the user 102 may select an "Enroll my card" option in the interface of the client device 104. In step 803, the client device 104 may communicate a payment device enrollment request to the application provider system 106. For example, the client device 104 may execute a HTTP POST request method to the application provider system 106 through the first communication channel 122. In step 805, the application provider system 106 may communicate a payment device enrollment request to a payment device issuance system 108. For example, the application provider system 106 may execute a HTTP POST request method to the payment device issuance system 108 through the first communication channel 122.

In response to receiving the payment device enrollment request, the payment device issuance system 108 may, in step 807, execute one or more checks to determine that the user may enroll their existing payment device. In step 809, in response to one or more of the checks being passed, the payment device issuance system 108 may generate a unique payment device token for the existing payment device. In step 811, the payment device issuance system 108 may generate a payment device enrollment request to a remote access system 110 for the existing payment device to be enrolled in the system for secure payment device data storage and access. For example, the payment device issuance system 108 may execute a HTTP POST request method to the remote access system 110 through the first communication channel 122.

In response to receiving the payment device enrollment request, which may include payment device data, the remote access system 110 may, in step 813, communicate a payment device enrollment response including a unique URL generated in association with the payment device. For example, the remote access system 110 may execute a HTTP 200 response method including the unique URL to the payment device issuance system 108 through the first communication channel 122. In step 815, the payment device issuance system 108 may communicate a payment device enrollment response including the unique payment device token and the unique URL to the application provider system 106. For example, the payment device issuance system 108 may execute a HTTP 200 response method to the application provider system 106 through the first communication channel 122. In step 817, the application provider system 106 may communicate a payment device enrollment response to the client device 104 including the unique payment device token and the unique URL. For example, the application provider system 106 may execute a HTTP 200 response method to the client device 104 through the first communication channel 122. In step 819, the user 102 may be able to see a message on the client device 104 that payment device enrollment was successful and may be prompted to view the payment device data by using the unique URL.

Figure 9:
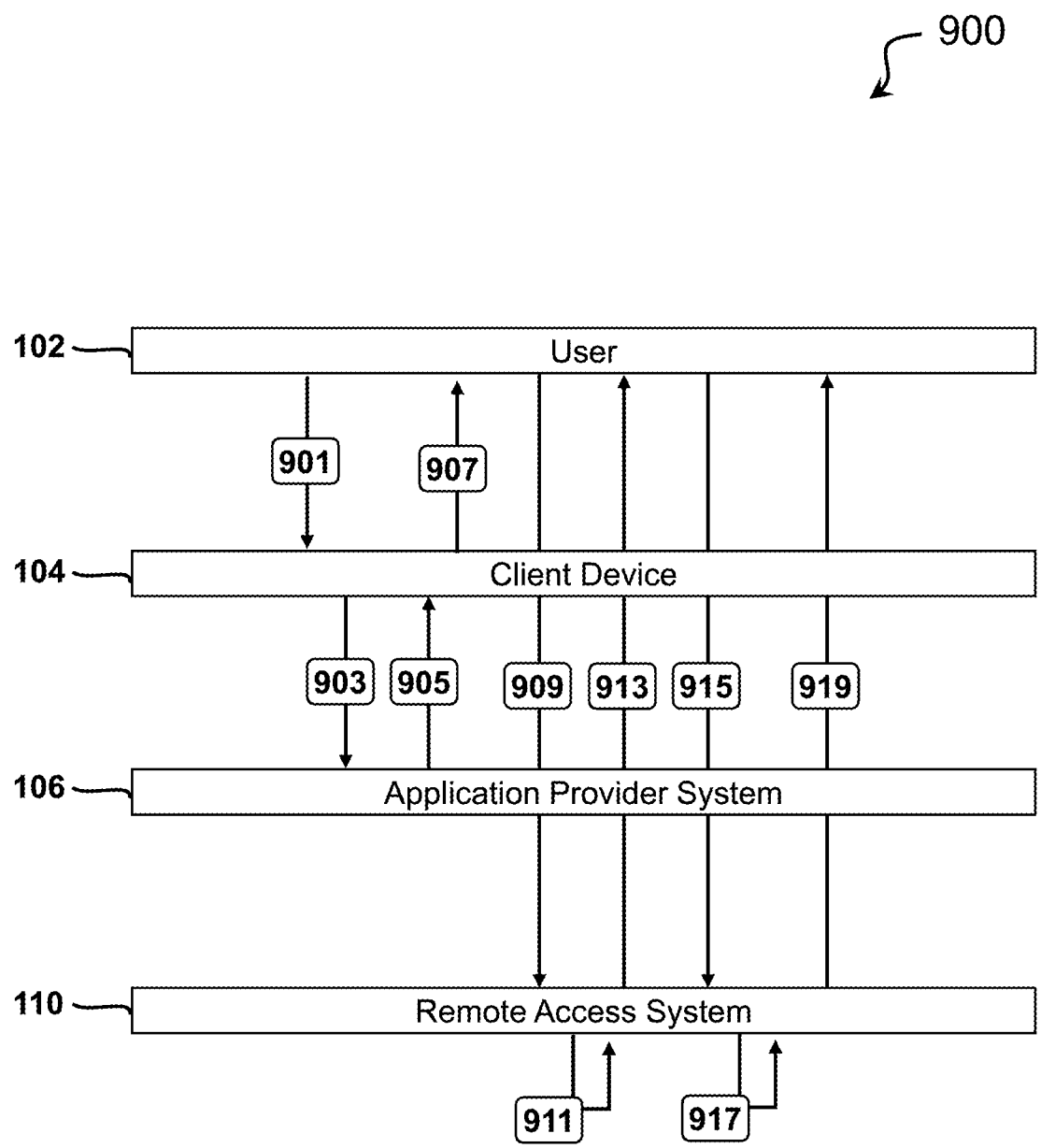
FIG. 9 is a process diagram illustrating a non-limiting embodiment or aspect of a method for secure payment device data storage and access, according to the principles of the present disclosure.

Referring now to FIG. 9, illustrated is a process diagram of a method 900 for accessing payment device data in a system for secure payment device data storage and access. The non-limiting embodiments or aspects depicted include steps of method 900 that are by and between user 102, client device 104, application provider system 106, and remote access system 110. It will be appreciated that one or more functions or steps of application provider system 106 and/or remote access system 110 may be executed by another system thereof.

User 102 may desire to access payment device data of payment device in a system for secure payment device data storage and access. In step 901, user 102 may initiate a primary data access request in an interface of the client device 104. In step 903, the client device 104 may communicate the primary data access request, including a unique payment device token, to the application provider system 106. For example, the client device 104 may execute a HTTP GET request method to the application provider system 106 through the first communication channel 122. In step 905, based on the unique payment device token, the application provider system 106 may communicate a primary data access response, including the unique URL for the payment device, to the client device 104. In step 907, the user 102 may view and initiate an option for a secondary data access request to access the payment device data using the unique URL.

In step 909, the user 102 may, using the client device 104 (in a same or separate interface than that provided by the application provider), use the unique URL to communicate a secondary data access request to the remote access system 110. For example, the client device 104 may execute a HTTP GET request method, using the unique URL, to the remote access system 110 through a second communication channel 124. In step 911, the remote access system may initiate a step-up authentication protocol to verify the identity of the user 102. In step 913, the remote access system may instruct the client device 104 to prompt the user 102 to input a one-time password that was communicated to the user 102 through a channel separate from the second communication channel 124. In step 915, the user 102 may enter the one-time password into the client device 104, which may communicate the entered one-time password to the remote access system 110. In step 917, the remote access system 110 may verify the entered one-time password, and thereby verify the identity of the user 102.

In response to successful verification of the identity of the user 102, remote access system 110 may, in step 919, communicate a secondary data access response to the client device 104 including the payment device data. The payment device data and/or the secondary data access response may be encrypted based on the client device 104 and configured so that only the client device 104 can decrypt the payment device data and/or the secondary data access response.

In further view of the foregoing non-limiting embodiments or aspects, the interface on a client device 104 may be a banking application of a financial institution. The banking application may include an option to "View Card Information". In response to the user 102 selecting the "View Card Information" option, the baking application may, internally or through a redirect to an external browser application, display the payment device data of the user's 102 payment device. In some non-limiting embodiments or aspects, where the payment device data is shown in the banking application, the payment device data may be received in a second communication channel 124 separate from the first communication channel 122 so that the application provider system 106 needs not receive or store payment device data, which may require additional computer resources to comply with heightened data security standards.

Although the present disclosure has been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:
   receiving, with at least one processor of a remote access system, a payment device enrollment request from an application provider system through a first communication channel comprising a first data transmission path, the payment device enrollment request comprising payment device data associated with a payment device of a user;
   in response to receiving the payment device enrollment request, generating, with the at least one processor, a unique payment device token associated with the payment device;
   transmitting, with the at least one processor, the unique payment device token for storage on a client device of the user by transmitting a payment device enrollment response comprising the unique payment device token to the application provider system through the first communication channel;
   storing, with the at least one processor, the payment device data;
   generating, with the at least one processor, a unique uniform resource locator (URL) associated with the payment device, the unique URL comprising a deep link accessible by the client device of the user;
   encrypting, with the at least one processor, the unique URL based on the unique payment device token stored on the client device to produce an encrypted unique URL, such that the encrypted unique URL is decryptable by the client device based on the unique payment device token;
   transmitting, with the at least one processor, the encrypted unique URL to the client device of the user via the application provider system through the first communication channel;
   receiving, with the at least one processor, a data access request from the client device via the unique URL through a second communication channel separate from the first communication channel, wherein the second communication channel comprises a second data transmission path different from the first data transmission path and is exclusive of the application provider system;
   in response to receiving the data access request, verifying, with the at least one processor, an identity of the user by executing a step-up authentication protocol; and
   in response to verifying the identity of the user, transmitting, with the at least one processor, a data access response comprising the payment device data to the client device through the second communication channel.

2. The computer-implemented method of claim 1, further comprising:
   receiving, with the at least one processor, a user enrollment request from the application provider system through the first communication channel, the user enrollment request associated with the user and initiated by the user on the client device; and
   in response to receiving the user enrollment request:
      generating, with the at least one processor, a unique user token associated with the user; and
      transmitting, with the at least one processor, the unique user token to the client device by transmitting a user enrollment response comprising the unique user token to the application provider system through the first communication channel;
   wherein the payment device data is stored in association with the unique user token.

3. The computer-implemented method of claim 2, wherein the payment device enrollment request further comprises the unique user token, and wherein the method further comprises:
   in response to receiving the payment device enrollment request, storing, with the at least one processor, the payment device data in association with the unique user token;

wherein the transmitting of the encrypted unique URL to the application provider system through the first communication channel comprises transmitting a payment device enrollment response comprising the encrypted unique URL to the application provider system through the first communication channel.

4. The computer-implemented method of claim 3, wherein the payment device enrollment request is received, with the at least one processor, at a payment device issuance system, in response to a new payment device issuance request initiated by the user on the client device.

5. The computer-implemented method of claim 1, wherein at least one of the following is encrypted based on the unique payment device token stored on the client device and is configured to be decrypted only by the client device based on the unique payment device token: the payment device data; the unique URL; the data access response; or any combination thereof.

6. The computer-implemented method of claim 1, wherein the unique URL is a temporary, one-time-use URL, the method further comprising, before transmitting each subsequent data access response, regenerating, with the at least one processor, the unique URL associated with the payment device.

7. A system comprising a server of a remote access system comprising at least one processor, the server being programmed or configured to:
receive a payment device enrollment request from an application provider system through a first communication channel comprising a first data transmission path, the payment device enrollment request comprising payment device data associated with a payment device of a user;
in response to receiving the payment device enrollment request, generate a unique payment device token associated with the payment device;
transmit the unique payment device token for storage on a client device of the user by transmitting a payment device enrollment response comprising the unique payment device token to the application provider system through the first communication channel;
store the payment device data;
generate a unique uniform resource locator (URL) associated with the payment device, the unique URL comprising a deep link accessible by the client device of the user;
encrypt the unique URL based on the unique payment device token stored on the client device to produce an encrypted unique URL, such that the encrypted unique URL is decryptable by the client device based on the unique payment device token;
transmit the encrypted unique URL to the client device of the user via the application provider system through the first communication channel;
receive a data access request from the client device via the unique URL through a second communication channel separate from the first communication channel, wherein the second communication channel comprises a second data transmission path different from the first data transmission path and is exclusive of the application provider system;
in response to receiving the data access request, verify an identity of the user by executing a step-up authentication protocol; and
in response to verifying the identity of the user, transmit a data access response comprising the payment device data to the client device through the second communication channel.

8. The system of claim 7, wherein the server is further programmed or configured to:
receive a user enrollment request from the application provider system through the first communication channel, the user enrollment request associated with the user and initiated by the user on the client device; and
in response to receiving the user enrollment request:
generate a unique user token associated with the user; and
transmit the unique user token to the client device by transmitting a user enrollment response comprising the unique user token to the application provider system through the first communication channel;
wherein the payment device data is stored in association with the unique user token.

9. The system of claim 8, wherein the payment device enrollment request further comprises the unique user token, and wherein the server is further programmed or configured to:
in response to receiving the payment device enrollment request, store the payment device data in association with the unique user token;
wherein the transmitting of the encrypted unique URL to the application provider system through the first communication channel comprises transmitting a payment device enrollment response comprising the encrypted unique URL to the application provider system through the first communication channel.

10. The system of claim 9, wherein the payment device enrollment request is received at a payment device issuance system, in response to a new payment device issuance request initiated by the user on the client device.

11. The system of claim 7, wherein at least one of the following is encrypted based on the unique payment device token stored on the client device and is configured to be decrypted only by the client device based on the unique payment device token: the payment device data; the unique URL; the data access response; or any combination thereof.

12. The system of claim 7, wherein the unique URL is a temporary, one-time-use URL, the server being further programmed or configured to, before transmitting each subsequent data access response, regenerate the unique URL associated with the payment device.

13. A computer program product comprising at least one non-transitory computer-readable medium including program instructions that, when executed by at least one processor of a remote access system, cause the at least one processor to:
receive a payment device enrollment request from an application provider system through a first communication channel comprising a first data transmission path, the payment device enrollment request comprising payment device data associated with a payment device of a user;
in response to receiving the payment device enrollment request, generate a unique payment device token associated with the payment device;
transmit the unique payment device token for storage on a client device of the user by transmitting a payment device enrollment response comprising the unique payment device token to the application provider system through the first communication channel;

store the payment device data;
generate a unique uniform resource locator (URL) associated with the payment device, the unique URL comprising a deep link accessible by the client device of the user;
encrypt the unique URL based on the unique payment device token stored on the client device to produce an encrypted unique URL, such that the encrypted unique URL is decryptable by the client device based on the unique payment device token;
transmit the encrypted unique URL to the client device of the user via the application provider system through the first communication channel;
receive a data access request from the client device via the unique URL through a second communication channel separate from the first communication channel, wherein the second communication channel comprises a second data transmission path different from the first data transmission path and is exclusive of the application provider system;
in response to receiving the data access request, verify an identity of the user by executing a step-up authentication protocol; and
in response to verifying the identity of the user, transmit a data access response comprising the payment device data to the client device through the second communication channel.

14. The computer program product of claim 13, wherein the program instructions further cause the at least one processor to:
receive a user enrollment request from the application provider system through the first communication channel, the user enrollment request associated with the user and initiated by the user on the client device; and
in response to receiving the user enrollment request:
generate a unique user token associated with the user; and
transmit the unique user token to the client device by transmitting a user enrollment response comprising the unique user token to the application provider system through the first communication channel;
wherein the payment device data is stored in association with the unique user token.

15. The computer program product of claim 14, wherein the payment device enrollment request further comprises the unique user token, and wherein the program instructions further cause the at least one processor to:
in response to receiving the payment device enrollment request, store the payment device data in association with the unique user token;
wherein the transmitting of the encrypted unique URL to the application provider system through the first communication channel comprises transmitting a payment device enrollment response comprising the encrypted unique URL to the application provider system through the first communication channel.

16. The computer program product of claim 15, wherein the program instructions further cause the at least one processor to:
in response to receiving the payment device enrollment request, generate a unique payment device token associated with the payment device; and
transmit the unique payment device token for storage on the client device by transmitting the payment device enrollment response comprising the unique payment device token to the application provider system through the first communication channel.

17. The computer program product of claim 13, wherein at least one of the following is encrypted based on the unique payment device token stored on the client device and is configured to be decrypted only by the client device based on the unique payment device token: the payment device data; the unique URL; the data access response; or any combination thereof.

18. The computer program product of claim 13, wherein the unique URL is a temporary, one-time-use URL, the program instructions further causing the at least one processor to, before transmitting each subsequent data access response, regenerate the unique URL associated with the payment device.

* * * * *